March 10, 1953  R. W. COOK  2,631,060
LAWN SPRINKLER

Filed Aug. 22, 1950                     2 SHEETS—SHEET 1

INVENTOR.
RALPH W. COOK
BY
McMorrow, Berman + Davidson
ATTORNEYS

March 10, 1953　　　　R. W. COOK　　　　2,631,060
LAWN SPRINKLER
Filed Aug. 22, 1950　　　　　　　　　　　2 SHEETS—SHEET 2
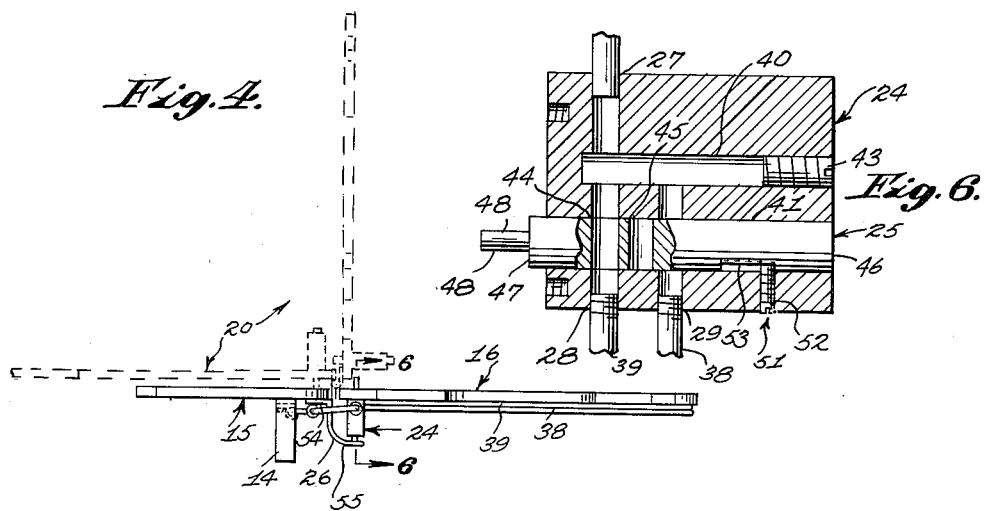
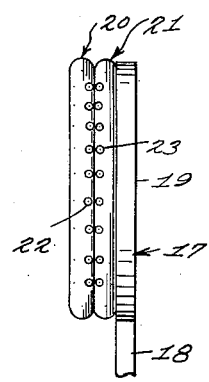
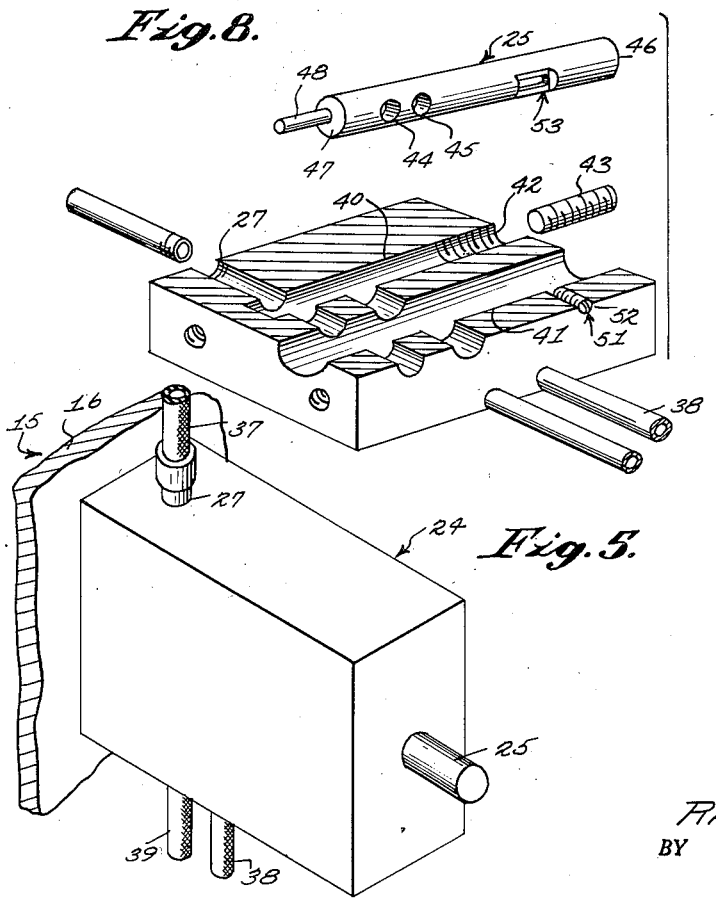
INVENTOR.
RALPH W. COOK
BY
McMorrow, Berman & Davidson
ATTORNEYS Patented Mar. 10, 1953

2,631,060

UNITED STATES PATENT OFFICE 2,631,060

LAWN SPRINKLER

Ralph W. Cook, Hewett, W. Va.

Application August 22, 1950, Serial No. 180,827

2 Claims. (Cl. 299—71)

This invention relates to sprinklers, and more particularly to a lawn sprinkler including a simulated human figure having an arm which is mounted for swinging movement from side to side and carries a sprinkler can arranged to throw a spray of water over a relatively wide area in an arc of a circle.

Another object of this invention is to provide a lawn sprinkler including a swinging arm which, during movement, simulates in appearance a lifelike object watering a lawn, and thereby amuses onlookers.

A further object of this invention is to provide a lawn sprinkler including a swinging arm which is mounted for movement from side to side and is provided with novel means for automatically reversing the direction of movement of the arm at predetermined points in its path of swinging movement.

A still further object of this invention is to provide a lawn sprinkler which is relatively simple in structure and cheap to manufacture.

The above and still further objects and advantages of the invention will become apparent upon consideration of the following detailed description of the invention when taken in conjunction with the accompanying drawings, wherein:

Figure 4 is a top plan view of the lawn sprinkler shown in Figures 1 and 2, taken from the top of Figure 2;

Figure 5 is an enlarged perspective view, with parts broken away and shown in section, of the valve control forming a part of the lawn sprinkler of the present invention;

Figure 6 is an enlarged sectional view of the valve control taken along the line 6—6 of Figure 4;

Figure 7 is an enlarged end elevational view of the jet spray heads forming a part of the lawn sprinkler of the present invention; and Figure 8 is an exploded perspective view of the valve control shown in Figures 5 and 6, showing the internal structure of the valve control.

Figure 1:
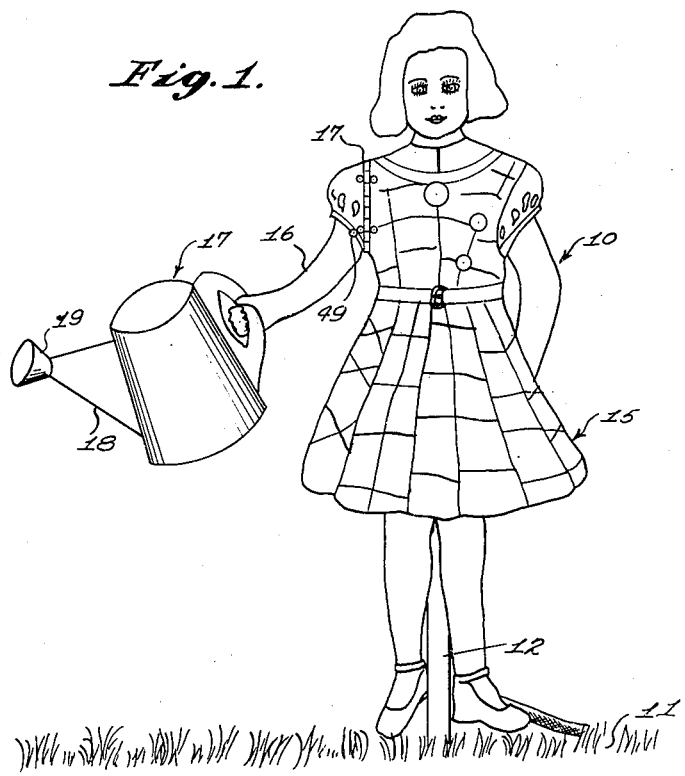
Figure 1 is a front elevational view of the lawn sprinkler of the present invention, shown supported on a ground surface.

Referring now more particularly to the drawings, wherein like reference numerals have been used throughout the several views to designate like parts, there is shown a water sprinkler according to the present invention, generally designated by the reference numeral 10 supported on a ground surface 11.

Figure 3:
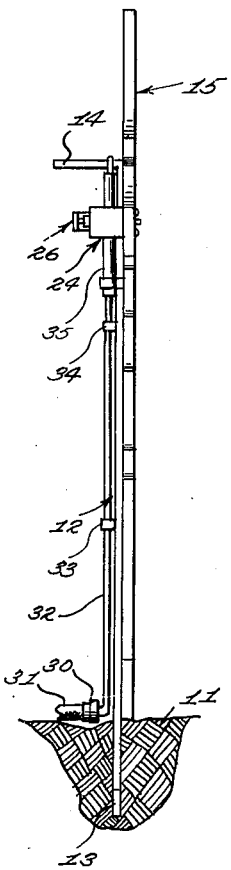
Figure 3 is a side elevational view of the lawn sprinkler shown in Figures 1 and 2 taken from the left of Figure 1.

The water sprinkler 10 embodies an elongated standard 12 having its lower end pointed, as indicated by the reference numeral 13, Figure 3, for insertion in the ground surface 11 and having its upper end laterally offset to form an anchoring handle 14. Carried by the standard 12 is an upstanding body plate 15 which is shaped to simulate a clothed human figure and includes a laterally projecting arm 16 mounted for swinging movement by means of the vertical axis hinge 17 from a position in the plane of the body plate 15 to a position in front of the body plate.

Positioned contiguous to the free end of the arm 16 and secured thereto is a cutout 17 which simulates a sprinkling can and includes a pouring spout 18. One face of the body plate 15 is suitably colored and ornamented to simulate the desired human figure, and the adjacent face of the cutout 17 is ornamented to simulate the sprinkling can. Any attractive design may be selected for the body plate 15, and the sprinkling can 17, as is apparent to any one skilled in the art.

Figure 2:
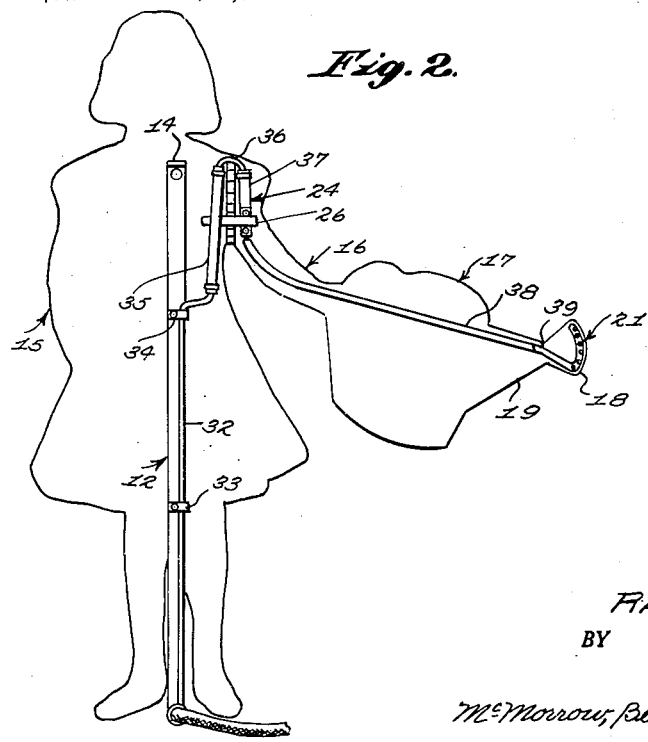
Figure 2 is a rear elevational view of the lawn sprinkler shown in Figure 1.

Carried on the back face of the sprinkling can 17 and substantially overlying the enlarged head 19 of the pouring spout 18 are the first and second jet spray heads 20 and 21. Each of the jet heads 20 and 21 is provided with apertures designated by the reference numerals 22 and 23 through which water is jetted. Upon connecting the jet spray head 20 to a suitable source of water under pressure, the flow of water through the apertures 22 thereof will urge the projecting arm 16 out of the confronting position illustrated in phantom in Figure 4 into the aligned position shown in Figures 1, 2 and 4. Upon the egress of water through the spaced apertures 23 of the jet spray head 21, the force of the spray will urge the projecting arm 16 out of the aligned position illustrated in Figures 1, 2 and 4 into the confronting position illustrated in phantom in Figure 4.

Carried by the projecting arm 16 is a valve control 24 which is adapted to be connected to a source of water under pressure and is connected in communication with the first and second jet spray heads 20 and 21. The valve control 24 embodies a control rod 25 which is actuable in response to engagement with the adjacent face of the body 15 in the confronting position of the projecting arm 16 for connecting the water source to the jet head 20. Carried on the back face of the body 15 is a changer element 26 which is engageable with the other end of the control arm 25 in the aligned position of said projecting arm 16 for actuating the rod 25 into a position connecting the water source to the second jet spray head 21. Accordingly, at select, predetermined points in the path of swinging movement of the projecting arm 16, the actuating means provided by the jet heads 20 and 21 will be selectively connected to a source of water to thereby automatically reverse the direction of movement of the arm 16.

Referring now to Figures 5, 6 and 8, there is shown the structure of the valve control 24, which includes a transversely extending inlet port 27 and a pair of transversely extending outlet ports 28 and 29. The inlet port 27 is connected to a suitable source of water under pressure by means of the hose coupling 30 which couples a hose 31 connected to a source of water under pressure to a water inlet tube 32 which is secured along the standard 12 by means of the clamps 33 and 34. The free upper end of the water inlet tube is connected through a flexible hose 35, a connecting hose 36 and a second flexible hose section 37 to the inlet 27 of the valve control 24. The outlet port 29 of the valve control 24 is connected by means of an outlet tube 38 to the inlet of the jet spray head 20 and the outlet port 28 is connected to the jet spray head 21 by means of the outlet pipe or tube 39. The valve control 24 is further provided with a pair of spaced, longitudinally extending chambers designated by the reference numerals 40 and 41. The chamber 40 has one end terminating adjacent to and spaced from the adjacent end of the valve control and has the other end threaded, as indicated by the reference numeral 42, for the support of a closure plug 43. The chamber 41 extends completely through the valve control 24 and houses the control rod 25 which is provided with a pair of spaced, transversely extending apertures 44 and 45. As clearly shown in Figure 6, the aperture 44 is alignable with the outlet port 28 in a select position of the sliding movement of the rod 25 and completes a closed flow path from the inlet port 27 through the valve control and out of the latter into the jet spray head 21. The select position of the rod 25 is obtained when the end 46 of the rod is in substantial alignment with the adjacent face of the valve control. It is to be noted that the end 46 is in its position of substantial alignment when the changer 26 engages the rod 25. Upon aligning the other end 47 of the control rod 25 with the adjacent face of the valve control, the aperture 45 is in registry with the outlet port 29 and thereby completes a closed flow path from the inlet 27 through the outlet 29 and into the jet spray head 20. The last-named position of the control rod 25 is effected upon engagement of the control rod extension 48 with the decorated face of the body 15. As clearly shown in Figure 1, the projecting arm 16 is provided with an aperture 49 for the extension therethrough of the control rod extension 48 to permit the latter to engage against the decorated face of the body 15.

Carried by the body of the valve control 24 and engageable with the control rod 25 is a stop element 51 for limiting the sliding movement of the control rod 25 from a position wherein the aperture 44 is in registry with the outlet port 28 to a position wherein the aperture 45 is in registry with the outlet port 29. As clearly shown in Figure 6, the stop element embodies a threaded lug 52 which is supported transversely of the chamber or bore 41 and has its inner end engageable within an elongated slot 53 provided in the valve control rod 25.

Referring now with particularity to Figure 4, there is shown the changer 26 supported in position for engagement with the adjacent end of the valve control rod 25, the changer 26 embodying the bracket having one end 54 abutting against and secured to the back face of the body 15 and having the other end arcuately bent, as designated by the reference numeral 55, into the path of movement of the control rod 25 during movement of the assembly of the valve control 24 and the arm 16.

In actual use, the lawn sprinkler 10 of the present invention is mounted by applying a downwardly directed pressure on the anchoring handle 14 to thereby urge the pointed end of the standard 12 into the ground. The water hose 31 is then screwed to the coupling 30, and when the water pressure is turned on, a flow path will be completed upwardly through the water inlet tube 32, the flexible couplings 35 and 36 and 37, and thence into the valve control 24. The select starting position of the valve control 24 will be determined by the positioning of the projecting arm 16 with respect to the body 15. The valve control rod 25 will be urged back and forth between the limits of its sliding movement in response to the engagement with the decorated face of the body 15 and with the changer 26 to thereby cause water to be selectively admitted to the jet spray heads 20 and 21. As previously pointed out, the egress of the water through the jet spray heads 20 and 21 will cause the movement of the projecting arm from the confronting position to the aligned position of Figure 1 in response to the movement of the control rod 25 of the valve control 24. Accordingly, the swinging arm 16 will throw a spray of water over a relatively wide area in the arc of a circle through an angle of approximately 180°, and during movement simulate in appearance a lifelike object watering a lawn.

Although only one embodiment of the lawn sprinkler of the present invention has been described, it is readily apparent that numerous modifications can be made without departing from the spirit of the invention as set forth in the appended claims.

What I claim is:

1. In an oscillating sprinkler, an upright relatively stationary body plate having a vertical side edge, a laterally projecting arm pivoted on a vertical axis on said body plate at said side edge thereof to swing from a normal starting position in which said arm is in the same transverse plane as said body plate to a position in front of and across said body plate, a control valve assembly mounted on the back of said arm, said valve assembly comprising a valve body having an endwise movable actuator rod, said rod having a first end and a second end, a fixed stop projecting rearwardly from said body plate in a position to be engaged by said first end of the rod as said arm returns to said normal starting position whereby said rod is shifted in said valve body, the second end of the actuator rod being arranged to engage and to be moved endwise by engagement thereof with the front of the body plate as said arm reaches its final position across and in front of the body plate, opposed spray heads on said arm having separate connections with said valve body, and a source of water under pressure connected to said valve body, said valve body having means therein controlled by the position of said actuating rod arranged to selectively connect the source of water under pressure to the opposed spray heads one at a time whereby said arm is alternately swung back and forth between its normal starting position and its final position.

2. In an oscillating sprinkler, an upright substantially vertical relatively stationary body plate having a vertical side edge, an arm arranged adjacent said side edge, a vertical hinge connecting said arm to said plate at said side edge for swinging movement around the vertical axis defined by said side edge, said arm being swingable from a normal starting position in the same vertical plane as said body plate to a final position in front of and extending across said body plate, a control valve assembly mounted on the back of said arm, said valve assembly comprising a valve body having an endwise movable valve rod slidably mounted therein, said rod having a first end and a second end, a fixed stop projecting rearwardly from said body plate in a position to be engaged by said first end of the rod as said arm returns to said normal starting position, whereby said rod is shifted in said valve body, the second end of the valve rod being arranged to engage and to be moved endwise by engagement thereof with the front of the body plate as said arm reaches said final position, opposed spray heads on said arm, respective outlet passages formed in said valve body, an inlet passage formed in said valve body, a pair of apertures formed in said valve rod, conduit means connecting said spray heads to the respective outlet passages, a source of water under pressure, conduit means connecting said source to said inlet passage, and means in said valve body controlled by the position of said valve rod arranged to selectively connect said inlet passage to one or the other of the respective outlet passages through said apertures in accordance with the position of the valve rod resulting from the movement of the rod in the valve body, whereby said arm is alternately swung back and forth around said vertical axis between its normal position and its final position.

RALPH W. COOK.

REFERENCES CITED

The following references are of record in the file of this patent:

UNITED STATES PATENTS

| Number | Name | Date |
| --- | --- | --- |
| 846,426 | Rhodes | Mar. 5, 1907 |
| 1,144,070 | Schneider | June 22, 1915 |
| 2,022,396 | Wiederhold | Nov. 26, 1935 |
| 2,087,175 | Voight | July 13, 1937 |